US012697884B2

(12) United States Patent
Srinivasan

(10) Patent No.: US 12,697,884 B2
(45) Date of Patent: Aug. 4, 2026

(54) PULSED ELECTRIC MACHINE CONTROL

(71) Applicant: Tula eTechnology, Inc., San Jose, CA (US)

(72) Inventor: Vijay Srinivasan, Farmington Hills, MI (US)

(73) Assignee: Tula eTechnology, Inc., San Jose, CA (US)

( * ) Notice: Subject to any disclaimer, the term of this patent is extended or adjusted under 35 U.S.C. 154(b) by 8 days.

(21) Appl. No.: 18/985,561

(22) Filed: Dec. 18, 2024

(65) Prior Publication Data

US 2025/0115136 A1 Apr. 10, 2025

Related U.S. Application Data

(63) Continuation-in-part of application No. 18/181,076, filed on Mar. 9, 2023, now Pat. No. 12,319,147, which is a continuation-in-part of application No. 17/158,230, filed on Jan. 26, 2021, now Pat. No. 11,628,730.

(51) Int. Cl.
B60L 15/20 (2006.01)

(52) U.S. Cl.
CPC .......... B60L 15/20 (2013.01); B60L 2240/26 (2013.01); B60L 2240/48 (2013.01); B60L 2240/662 (2013.01)

(58) Field of Classification Search
None
See application file for complete search history.

(56) References Cited

U.S. PATENT DOCUMENTS

| | | | |
|---|---|---|---|
| 4,441,043 A | 4/1984 | Decesare | |
| 4,989,146 A | 1/1991 | Imajo | |
| 5,099,410 A | 3/1992 | Divan | |
| 5,151,637 A | 9/1992 | Takada et al. | |
| 5,325,028 A | 6/1994 | Davis | |
| 5,483,141 A | 1/1996 | Uesugi | |
| 5,640,073 A | 6/1997 | Ikeda et al. | |
| 5,731,669 A | 3/1998 | Shimizu et al. | |
| 6,291,960 B1 | 9/2001 | Crombez | |
| 6,308,123 B1 | 10/2001 | Ikegaya et al. | |
| 6,370,049 B1 | 4/2002 | Heikkila | |
| 6,424,799 B1 | 7/2002 | Gilmore | |
| 6,493,204 B1 | 12/2002 | Glidden et al. | |
| 6,605,912 B1 | 8/2003 | Bharadwaj et al. | |
| 6,829,515 B2 | 12/2004 | Grimm | |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

(Continued)

*Primary Examiner* — Kenneth M Dunne
(74) *Attorney, Agent, or Firm* — Beyer Law Group LLP

(57) ABSTRACT

Pulsed control of electric motors, and more particularly, to selectively adjusting one or more of a pulsing frequency, an amplitude of the pulses and/or a duty cycle of the pulses for reducing Noise, Vibration and Harshness (NVH).

39 Claims, 11 Drawing Sheets

(56)  References Cited

U.S. PATENT DOCUMENTS

| | | |
|---|---|---|
| 6,829,556 B2 | 12/2004 | Kumar |
| 6,906,485 B2 | 6/2005 | Hussein |
| 6,940,239 B2 | 9/2005 | Iwanaga et al. |
| 6,984,946 B2 | 1/2006 | Donnelly et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,928,686 B2 | 4/2011 | Saha et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,744,656 B2 | 6/2014 | Sato et al. |
| 8,768,563 B2 | 7/2014 | Nitzberg et al. |
| 8,773,063 B2 | 7/2014 | Nakata |
| 9,007,005 B2 | 4/2015 | Sung et al. |
| 9,007,013 B2 | 4/2015 | Bae et al. |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,427,177 B2 | 8/2022 | Serrano et al. |
| 11,623,529 B2 | 4/2023 | Carvell et al. |
| 11,626,827 B2 | 4/2023 | Tripathi |
| 11,628,730 B2 | 4/2023 | Srinivasan |
| 11,695,361 B2 | 7/2023 | Carvell et al. |
| 11,863,096 B2 | 1/2024 | Carvell |
| 11,973,447 B2 | 4/2024 | Chen |
| 12,003,202 B2 | 6/2024 | Tripathi |
| 12,370,907 B2 | 7/2025 | Carvell |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0205778 A1 | 7/2017 | Barrass et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0267919 A1 | 8/2019 | Suzuki et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0203263 A1 | 7/2021 | Serrano et al. |
| 2021/0351733 A1 | 11/2021 | Carvell |
| 2022/0234451 A1 | 7/2022 | Srinivasan |
| 2023/0114289 A1 | 4/2023 | Islam et al. |
| 2023/0211672 A1 | 7/2023 | Srinivasan |
| 2023/0219426 A1 | 7/2023 | Carvell et al. |
| 2023/0223885 A1 | 7/2023 | Tripathi |
| 2023/0253911 A1 | 8/2023 | Islam |
| 2023/0308040 A1 | 9/2023 | Farah et al. |
| 2024/0022191 A1 | 1/2024 | Phillips et al. |
| 2024/0022199 A1 | 1/2024 | Phillips et al. |
| 2024/0022200 A1 | 1/2024 | Phillips et al. |
| 2024/0063735 A1 | 2/2024 | Islam et al. |
| 2024/0063744 A1 | 2/2024 | Islam et al. |
| 2024/0063745 A1 | 2/2024 | Parsels et al. |
| 2024/0088806 A1 | 3/2024 | Carvell et al. |
| 2024/0136968 A1 | 4/2024 | Mazda |
| 2024/0291410 A1 | 8/2024 | Carvell et al. |

(56) References Cited

U.S. PATENT DOCUMENTS

| 2024/0291416 | A1 | 8/2024 | Tripathi |
| 2024/0364250 | A1 | 10/2024 | Carvell |
| 2024/0372489 | A1 | 11/2024 | Srinivasan |
| 2025/0055397 | A1 | 2/2025 | Chen et al. |

FOREIGN PATENT DOCUMENTS

| CN | 104716754 | A | 6/2015 |
| CN | 204589885 | U | 8/2015 |
| CN | 105196877 | A | 12/2015 |
| CN | 205229379 | U | 5/2016 |
| CN | 106932208 | A | 7/2017 |
| CN | 107067780 | A | 8/2017 |
| CN | 207129052 | U | 3/2018 |
| CN | 108216026 | A | 6/2018 |
| CN | 108445386 | A | 8/2018 |
| CN | 110212725 | | 9/2019 |
| DE | 102014206342 | | 10/2015 |
| EP | 2605398 | A1 | 6/2013 |
| FR | 2989479 | | 10/2013 |
| GB | 2273212 | | 8/1994 |
| JP | H05153705 | | 6/1993 |
| JP | 10243680 | | 9/1998 |
| JP | 2008-079686 | A | 4/2008 |
| JP | 2009-065758 | A | 3/2009 |
| JP | 2009-118544 | | 5/2009 |
| JP | 2011-67043 | | 3/2011 |
| JP | 2012-228134 | | 11/2012 |
| JP | 5165660 | B2 | 12/2012 |
| JP | 2014-033449 | A | 2/2014 |
| JP | 5857472 | B2 | 12/2015 |
| JP | 2017-011970 | A | 1/2017 |
| JP | 2017-200382 | | 11/2017 |
| JP | 2018-033250 | A | 3/2018 |
| JP | 2019-202603 | | 11/2019 |
| JP | 2020048254 | A | 3/2020 |
| KR | 10-2014-0038841 | | 3/2014 |
| KR | 10-2017-0021146 | A | 2/2017 |
| KR | 10-2017-0032976 | A | 3/2017 |
| WO | WO03/36787 | A1 | 5/2003 |
| WO | WO2012-010993 | A2 | 1/2012 |

OTHER PUBLICATIONS

Spong et al., "Feedback Linearizing Control of Switched Reluctance Motors", IEEE Transactions on Automatic Control, vol. AC-32, No. 5, May 1987, pp. 371-379.

International Search Report and Written Opinion dated Apr. 18, 2022 from International Application No. PCT/US2021/063876.

Chen et al., Optimizing Electric Motor Controls with Dynamic Motor Drive; 30th Aachen Colloquium Sustainable Mobility 2021.

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Torque/ Speed/ Efficiency Characteristics

60

Inputs

User Controlled

- User Selectable NVH Control
- ECO MODE

Vehicle Status Inputs

- Gear Status
- FWD/RWD/AWD Status

Sensor Inputs

- Drive Line NVH
- Driver/Passenger Occupancy
- Weight/Load
- Ambient Temperature

Model Inputs

- Motor Mounts
- Vehicle Age/Mileage

NVH Masking Systems

- Active Noise Control
- Active Vibration Control

Road Surface Conditions

- Camera(s)
- LIDAR
- RADAR
- GPS

FIG. 5B

SENSED NVH
FROM DRIVE LINE

THRESHOLD
(ADJUSTABLE)

COMPARATOR

ADJUST PULSING
FREQUENCY AND/OR
PULSING AMPLITUDE
BASED ON
THE COMPARISON $$FA = OnTorque \cdot \left(\frac{2}{\pi}\right) \cdot \sin(\pi \cdot dutyCycle)$$

PULSED ELECTRIC MACHINE CONTROL

CROSS-REFERENCE TO RELATED APPLICATIONS

This application is a Continuation-in-Part of U.S. application Ser. No. 18/181,076, filed Mar. 9, 2023, which is a Continuation-in-Part of U.S. application Ser. No. 17/158,230, filed on Jan. 26, 2021 (now U.S. Pat. No. 11,628,730, issued Apr. 18, 2023), both of which are incorporated by reference herein in their entirety.

BACKGROUND

The present application relates generally to pulsed control of electric motors, and more particularly, to selectively adjusting one or more of a pulsing frequency, an amplitude of the pulses and/or a duty cycle of the pulses for reducing Noise, Vibration and Harshness (NVH) while maintaining high levels of operating efficiency.

Electric motors and generators are structurally very similar. Both include a stator having a number of poles and a rotor. Most electrical motors can operate as a generator and vice-versa. When operating as motor, electrical energy is converted into mechanical energy. When operating as a generator, mechanical energy is converted into electrical energy. The term "machine" as used herein is therefore intended to be broadly construed to mean both electric motors and generators.

Electric machines are used in a wide variety of applications and are typically required to operate under a wide variety of loads. Since the energy conversion efficiency can vary considerably based on their measurable load, sometimes electric machines will operate at their peak efficiency, but very often they are required to operate outside their peak efficiency levels.

The pulsing is a known approach for improving machine efficiency. With a motor for example, an output torque is generated when pulsed on, but no torque output is generated between pulses. As a general rule, the amplitude (i.e., torque output) of the pulses is selected to be at or near the highest efficiency range of the motor while the duty cycle (i.e., the percentage of time the motor is pulsed on versus pulsed off) and/or frequency (i.e., the time interval between the pulses) are selected so that the overall output of the motor meets the requested torque demand, while operating as efficiently and economically as possible.

While the pulsed operation of machines increases efficiency and economy, there can be some downsides. In particular, the higher the amplitude of the pulses, the more Noise, Vibration and Harshness (NVH) that is typically generated. Also, if the frequency of the pulses is too low, excessive NVH may also result. In many applications, such as the use of motors in electric and/or hybrid vehicles, excessive NVH is unacceptable.

A need therefore exists to selectively adjust one or more of frequency, amplitude and/or duty cycle of the pulses used for pulsed operation of an electric machine for the purpose of reducing NVH, while still maintaining high levels of operating efficiency and economy.

SUMMARY

The present invention relates to a system and method for adjusting a pulsing frequency, the On-Torque amplitude and duty cycle during pulsed operation of an electric machine on vehicle for tuning Noise, Vibration and Harshness (NVH) to acceptable levels. In various alternative embodiments, the acceptable levels of NVH may vary depending on a wide variety of factors that may dictate lower levels of NVH or allow for higher levels of NVH. In a non-exclusive example with an electric vehicle with either a parallel or range extending internal combustion engine (ICE) onboard, then higher levels of NVH may be tolerated, at least during operation of the internal combustion engine, since the noise and vibration of engine will mask out the NVH generated during pulsed operation of the electric machine. On the other hand with an electric vehicle without an ICE, the acceptable level of NVH may be based on other factors besides whether an ICE is operating or not. In other embodiments, a wide variety of other factors are considered in determining if the acceptable levels of NVH should be adjusted upward or downward.

BRIEF DESCRIPTION OF THE DRAWINGS

The invention and the advantages thereof, may best be understood by reference to the following description taken in conjunction with the accompanying drawings in which:

FIG. 5B is a non-exhaustive list of possible inputs that may be provided to the motor controller in accordance with a non-exclusive embodiment of the invention

In the drawings, like reference numerals are sometimes used to designate like structural elements. It should also be appreciated that the depictions in the figures are diagrammatic and not too scale.

DETAILED DESCRIPTION

The present disclosure relates generally to pulsed control of electric machines (e.g., electric motors and generators) to improve the energy conversion efficiency of the electric machine when operating conditions warrant. More specifically, under selected operating conditions, an electric machine is intermittently pulsed to operate at higher efficiency levels compared to conventional continuous machine control, thereby delivering a desired average torque output in a more energy efficient manner than previously possible.

The Applicant has filed a number of applications related to the pulse control of electric machines, including U.S. Provisional Patent Application No. 62/644,912, filed on Mar. 19, 2018, U.S. Provisional Patent Application No. 62/810,861, filed on Feb. 26, 2019, U.S. Provisional Application No. 62/819,097, filed Mar. 15, 2019 and U.S. Provisional Patent Application No. 62/658,739, filed Apr. 17, 2018. Each of the above-listed applications is incorporated by reference herein for all purposes.

For the sake of simplicity, the discussion below pertains to controlling the pulsing to reduce NVH in the context of motors used for electric vehicles and/or hybrid vehicles. It should be understood that the discussion below should in no regard be construed as limiting. On the contrary, the same or similar pulsing strategies, as described herein, are equally applicable to machines while operating as generators and machines operating in a wide variety of applications, such as appliances like washing machines, dryers and dishwashers, HVAC equipment such as compressors, etc.

Efficiency Maps

Figure 1:
FIG. 1 is a representative Torque/Speed/Efficiency graph illustrating the energy conversion efficiency of a representative electric machine operating as a motor under different operating conditions.

Referring to FIG. 1, a motor efficiency map 10 that illustrates the nature of the above-defined problem is shown. In particular, the map 10 diagrammatically shows the efficiency of a representative motor under a wide range of different machine speeds (the X-axis) and torque values (the Y-axis). A number of operating characteristics of the motor are evident from the map 10. These characteristics include:

(a) The illustrated motor is generally most efficient when it is operating within a particular speed range and generating torque within a defined range. For the particular motor shown, the most efficient region is the area designated by reference number 14, which is generally in the range of 4500-6000 RPM with a torque output in the range of about 50-80 Nm. In this region 14, the energy conversion efficiency of the motor is approximately 96%. The region 14 is thus sometimes referred to herein as the "sweet spot", which is the most efficient operating region for a given machine.

(b) At any particular machine speed, there will be a corresponding most efficient output torque, which is diagrammatically illustrated by a maximum efficiency curve 16. The motor's efficiency, for any given machine speed, tends to drop off somewhat when the load is higher or lower than the most efficient load. In some regions the motor's efficiency tends to drop relatively quickly, as for example, when the torque output falls below about 30 Nm in the illustrated exemplary motor.

(c) Also, when the desired motor torque is below the most efficient output torque as designated by the curve 16 for a given current machine speed; the overall efficiency of the motor can be improved by pulsed operation. Conversely, when the desired motor torque is at or above the maximum efficiency curve 16, the motor may be operated in a conventional (i.e., continuous/non-pulsed) manner to most efficiently deliver the desired torque.

Based on the above-defined observations, it is clear that the overall energy conversion efficiency of the motor could be significantly improved if the operating conditions are controlled so that the motor is almost always operated at or near its "sweet spot" designated by region 14. Unfortunately, many applications require that the motor operate over a wide range of varying torque requirements, and/or widely varying machine speeds, often which fall outside of the sweet spot.

One such application is automotive and other vehicle or mobility applications where the electric motor is often coupled to the wheel of the vehicle or other driveline component(s) (such as the gearbox, transmission, any internal combustion engine, driveshaft, differential, etc.). Over a typical drive cycle the machine speed may vary between zero when the vehicle is stopped to a relatively high RPM when cruising at highway speeds. The torque requirements may also vary widely at any of those speeds based on components such as whether the vehicle is accelerating or decelerating, going uphill, downhill, going on relatively flat terrain, vehicle weight, and many other factors. Of course, motors used in other applications may be subjected to a wide variety of operating conditions as well.

With pulsed control, the output of the machine is intelligently and intermittently modulated between "torque on" and "zero (no) torque" states in a manner that: (1) meet measurable torque demands, while (2) improving overall efficiency. Stated differently, under selected operating conditions, the electric machine is intermittently driven at a more efficient energy conversion operating level (the "torque on" state) to deliver a desired output. In the periods between the pulses, the machine ideally does not generate or consume any torque (the "zero torque" state). This can conceptually be thought of as turning the electric machine "off." In some implementations, this can be accomplished by effectively turning the electric machine "off," as for example, by shutting off drive current to a motor or the excitation current for a generator. However, in other implementations, the electric machine may be controlled during the "zero torque" state in a manner that attempts to cause the torque generated by the electric machine to be zero or as close to zero as practical or appropriate for the particular machine. In some implementations, any power converters used in conjunction with the electric machine may effectively be turned off for at least portions of the "zero torque" periods as well.

The efficiency map illustrated in FIG. 1, which happens to be for an internal permanent magnet synchronous motor used in a 2010 Toyota Prius, is merely illustrative. Similar efficiency maps can be generated for just about any electric machine although the operating characteristics of each map will vary from one machine to the next. The map of FIG. 1 should therefore not be construed as limiting in any regard.

Pulsed Motor Operation and Duty Cycles

Figure 2:
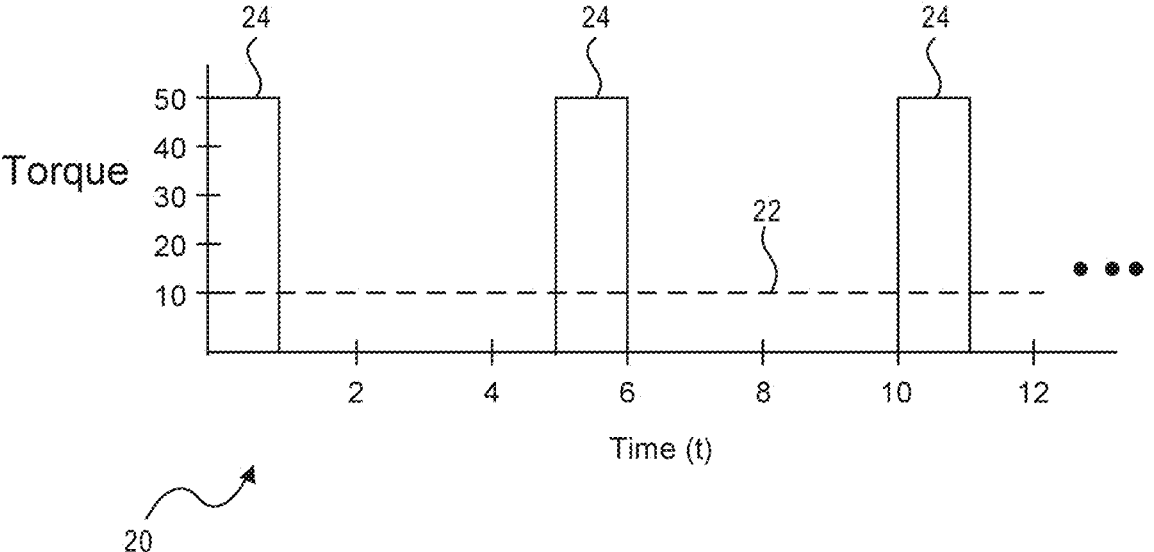
FIG. 2 is a graph illustrating a pulsed drive signal for an electric machine.

FIG. 2 is a plot 20 that illustrates an example of pulsed motor operation. In this particular example, the desired motor torque output is 10 Nm (as designated by the dashed line 22). The peak efficiency of this particular motor is at an output of 50 Nm of torque.

The plot 20 is useful in illustrating how the motor can be operated in different modes, each resulting in the generation of the desired motor torque of 10 Nm. However, as explained below, efficiency of the motor can be improved depending on which mode of operation is selected.

In a first mode, the motor can be run continuously, generating a steady output of 10 Nm. As noted above, since a steady output of 10 Nm is well below the most efficient output of the motor, this mode of operation is clearly less than ideal from an efficiency point of view.

In a second mode, the motor can be driven at its peak efficiency output of 50 Nm, but with a duty cycle of only 20% and delivering zero (no) torque the remaining 80% of the time. In other words, by pulsing the motor on using a twenty percent (20%) duty cycle at peak efficiency of 50 Nm, and off the remaining eighty percent (80%) of time between pulses, the same net output of 10 Nm is realized, but the overall efficiency of the motor is significantly improved.

FIG. 2 illustrates the second mode of operation. The on pulses 24 have amplitude of 50 Nm and a time period or frequency of 1 time unit out of every 5 time units (i.e., 20%). During the intervening 4 time periods (80%), the motor is controlled to produce zero torque. The net result is the average torque output is the desired 10 Nm, but with the motor operating almost exclusively in the peak efficiency range, overall efficiency is significantly improved.

The second mode of operation can be widely varied to meet changing measurable torque demands. For instance:

(a) If the desired motor output changes to 20 Nm, the duty cycle of the motor operating at 50 Nm can be increased to 40%;

(b) If the desired motor output changes to 40 Nm, the duty cycle can be increased to 80%;

(c) If the desired motor output changes to 5 Nm, the duty cycle can be reduced to 10% and so on.

As long as the desired motor output does not exceed the peak efficiency of 50 Nm, the desired motor output can be met merely by changing the duty cycle of the motor operating at 50 Nm. As each of these examples illustrate, pulsing the motor will advantageously yield efficiency benefits when the desired motor torque falls below the maximum efficiency curve 16.

The frequency or timing of the on and/or off time units actually used may vary widely based on the size, nature and design needs of any particular machine system. In practice, when the motor is switched from the "torque on" state to the "zero torque" state relatively rapidly to achieve a desired duty cycle, the fact that the motor is actually being switched back and forth between these states may not materially degrade the performance of the motor from a measurable standpoint. In some embodiments, the timing of the periods for each on/off cycle may widely vary. For example, in the above listed U.S. patent applications, the expected on/off cycle is described as being in the order of 100 μsec to 0.10 seconds (i.e. pulsing at a frequency in the range of 10 to 10,000 Hz), as for example in the range of 20 to 1000 Hz, or 20 to 100 Hz. The appropriate pulsing frequency may be a function of the type of electric motor being controlled and the application's tolerance for NVH that may be introduced by pulsing.

The zero torque portions of the pulse cycle might conceptually be viewed as shutting the motor off, although in many cases the motor may not actually be shut off during those periods or may be shut off for only portions of the "zero torque" intervals.

Pulsing of Alternating Current (AC) Motors

Many electric motors used for general passenger vehicles are designed to operate using alternating current (AC). However, this is by no means a requirement. With other vehicles, the motors used can be permanent magnet AC, induction AC and/or DC.

Figure 3A:
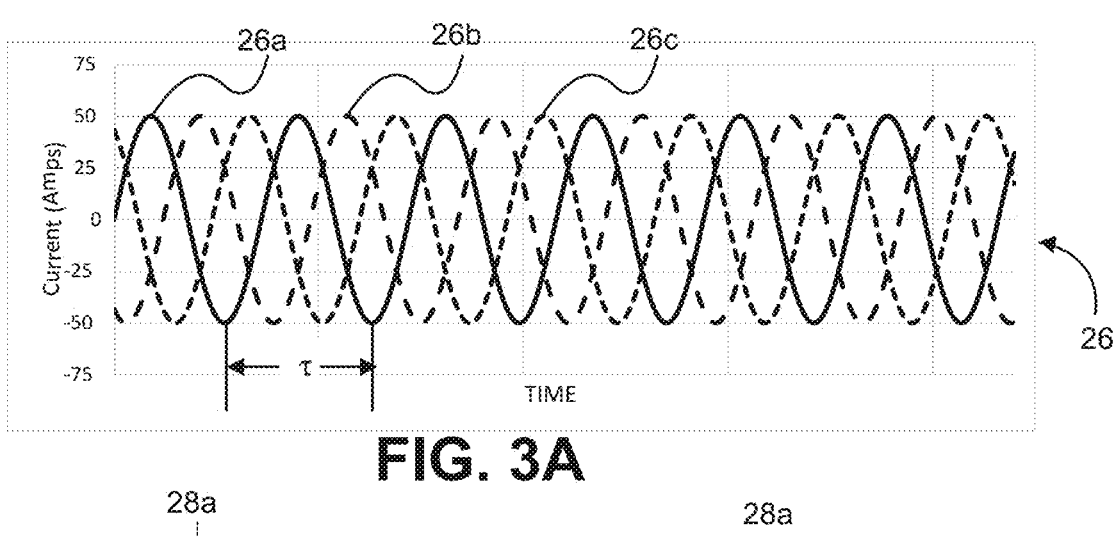
FIG. 3A is a diagrammatic representation of a continuous three-phase AC drive signal waveform.
Figure 3B:
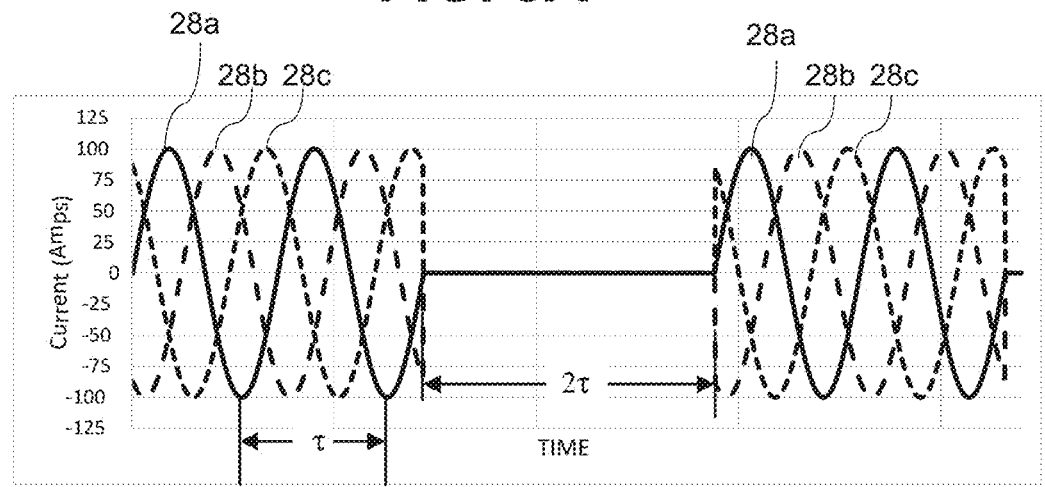
FIGS. 3B and 3C are two different examples of pulsed three-phase AC waveforms generating the same torque output as the continuous waveform of FIG. 2A, both having a 50% duty cycle, but different frequencies.
Figure 3C:
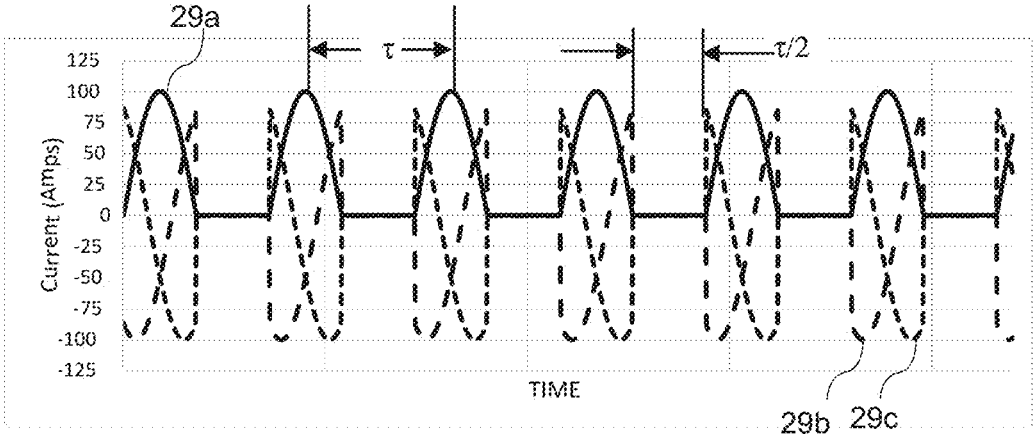

FIGS. 3A-3C are plots illustrating the difference between continuous and pulsed alternating currents that may be input to an electric machine operating as a motor, as for example, a three-phase induction motor. In each plot, current is plotted on the vertical axis and time is plotted along the horizontal axis.

FIG. 3A illustrates conventional sinusoidal three-phased input current 26a, 26b, and 26c delivered to the electric machine. Phase B, denoted by 26b, leads phase A, denoted by 26a by 120 degrees. Phase C, denoted by 26c, leads phase B by 120 degrees. The sine wave period is t. The three-phased input power 26 is continuous (not pulsed) and has a designated maximum amplitude of approximately 50 amps. It should be appreciated that 50 amps is only a representative value and the current may have any value.

FIGS. 3B and 3C illustrate two examples of different pulsed three-phased currents 28a-c and 29a-c respectively, each having a fifty percent (50%) duty cycle and peak amplitude of approximately 100 amps. As in FIG. 3A the period of the base sine wave is τ, however, now the sine wave is modulated on and off. Assuming the machine speed is the same and the generated torque is substantially proportional to current, as is often the case, the delivered current in FIGS. 3B and 3C produces the same average torque as the continuously applied three-phased input current of FIG. 3. The difference between pulsed currents 28a-c and 29a-c is the duration of their respective current pulses and the interleaved "off" periods.

In FIG. 3B, the current pulses 28a-c are interleaved with "off" periods and "on" periods of equal length, both of which are 2τ.

In FIG. 3C, the current pulses 29a-c and the interleaved "off" periods again have equal duration. In this case the duration is τ/2.

In both examples, the duty cycle is 50%. However, the duration of the "on" and "off" time durations is different (i.e. the frequency of the pulsed modulation is different). The frequency of the pulsed modulation may vary based on the type of electrical machine used, noise and vibration considerations, current operating rotor speed and other factors. It is noted that the duration of the on pulses and the off periods are substantially the same because the duty cycle is 50% in these examples. In situations where the duty cycle is not 50%, then the duration of the on pulses and the duration between the on pulses will be different from each other.

FIGS. 3B-3C illustrates situations in which the "on" motor drive pulses are evenly spaced while the motor is operated at a steady state desired output level. Such an approach works well in many circumstances but is not a requirement. The duty cycle need not be 50% but can be adjusted to match the desired average output torque. Also, the phase of the on/off pulses need not be synchronized with the phase of the applied AC power. Thus, the relative sizes and/or timing of the motor drive pulses can be varied as long as they average out to deliver the desired torque.

Electric Machines and Vehicles

Electric and/or hybrid vehicles are now common and are increasing in popularity. It has been predicted that over the course of the next decade or two, electric and/or hybrid vehicles will surpass or altogether replace conventional internal combustion engine vehicles.

With electric and/or hybrid vehicles, one or more onboard traction machines is/are provided. In the case of an electric vehicle, only electric machine(s) is/are used to generate the needed torque to propel the vehicle. With a hybrid, the electric machine operates in cooperation with an internal combustion engine to propel the vehicle. With either type of vehicle, the torque generated by the electric machines may be a positive torque or a negative torque (i.e., the machine operates as a generator) to transfer vehicle kinetic energy into stored electrical energy. For example, with regenerative braking, the machine is typically used to convert mechanical energy into electrical energy that is stored in a storage device, such as a battery or capacitor. The stored energy can be used by the electric machine when operating as a motor, or alternatively to power other electrical systems on the vehicle, such as the air conditioner, heater, defroster, various lighting systems, entertainment system, etc.

The pulsing of an onboard machine when on a vehicle promises significant advantages for increased efficiency. By increasing efficiency, the range of the vehicle can be increased before either a battery recharge is needed and/or refueling is needed as is the case with hybrids. For example, if an electric vehicle with a range of 300 miles can increase its range by ten percent (10%) by operating the onboard machines more efficiently, then the range is extended by approximately another 30 miles.

Vehicles and NVH

In the automotive and truck industry, NVH is a major design consideration. If the NVH of a vehicle is too high, the experience for both the driver and other passenger occupants can become unpleasant. In addition, excessive NVH may cause premature wear and tear on the vehicle. The industry is therefore diligent in reducing NVH as much as reasonably possible. In addressing NVH related issues, three factors are generally considered, including:

(1) Sources of NVH. Generally, anything connected to the vehicle that vibrates, generates noise or harshness, such as the engine, motors, driveline components, wheels, open windows, exhaust systems, tire/road noise, gearboxes, differentials, etc., is considered a source of NVH;

(2) Engineering steps to reduce the transmission of the NVH to the driver or other occupants in the vehicle. For instance, engine or machine mounts, active vehicle suspensions, noise and damping materials, are examples of steps taken and/or materials used by automotive engineers to reduce the transmission of NVH; and (3) Features included on the vehicle to either (a) mask or reduce the amount of NVH perceived by the occupants or (b) to adjust the amounts of NVH that are considered acceptable. For instance, some vehicles now have active noise or vibration systems to cancel out noise and vibration within the cabin of the vehicle. Other vehicles may have active sound enhancement systems such as sports cars, which add noise within the cabin of the vehicle to make a more pleasing engine sound. Other vehicles may have driver selectable modes that will adjust the amount of NVH that is considered acceptable. If a vehicle is equipped with an economy mode or a sport mode, the amount of NVH that is considered acceptable when either of these modes is used is generally increased. In other words, with the economy and sport modes, the driver is making a conscious decision to forgo lower levels of NVH for either improved economy or performance respectively. On the other hand, the vehicle may also have a comfort mode, in which case active steps are taken to reduce the levels of NVH. In this latter mode, the driver is making a conscious decision to forgo economy for improved comfort.

Defining Pulse Parameters for Vehicle Applications

With the pulsing of electric machine for vehicle applications, the critical parameters of the pulses for meeting torque demands include (1) amplitude, (2) duty cycle, and (3) frequency. With vehicles powered by electric motors, the amplitude of the pulses is largely dictated by the optimal efficiency value of the motor for a given torque request and machine speed (i.e., the "sweet spot" as defined by maximum efficiency curve 16 of FIG. 1 for example) but may be further reduced from the optimal value due to NVH considerations. By pulsing the amplitude at or near the "sweet spot", the most efficient and economical operation can be achieved. With the amplitude of the pulses known, determining the duty cycle is relatively straight forward. The duty cycle is dictated by the ratio of the requested torque versus the chosen amplitude of the pulses. Accordingly, the first two parameters are readily determined.

Determining the third parameter, the frequency of the pulses, however, is more challenging since there are opposing factors to consider. With automotive applications, the pulsing of a machine at low frequencies causes mechanical vibrations. Since humans are most sensitive to low frequency mechanical vibrations in the 2-10 Hz frequency range, a pulsing frequency within this range may result in high or even unacceptable levels of NVH. Thus, for vehicles, the ideal pulsing frequency is typically at a higher frequency rate, but not too high a rate such that some or all efficiency gains resulting from pulsed operation are lost in switching transients. The objective then is to select, for a given torque request and speed, a pulse frequency and pulse amplitude so as to preserve or maintain efficiency gains while meeting acceptable levels of NVH.

Factors that Affect NVH

One aspect of the present application is to select a pulsing frequency pulsing amplitude for electric machines that are used on vehicles. Rather than picking a pulsing frequency and/or pulsing amplitude simply based on avoiding the 2-10 Hz frequency range, the present application teaches that numerous other factors may also be used to adjust or "fine tune" the pulsing frequency and/or pulsing amplitude so as to (1) achieve high levels of economy while (2) providing a driving experience with acceptable levels of NVH. Such other factors include a number of measurable parameters of components on the vehicle itself and/or features on the vehicle that may affect the level of NVH that is considered acceptable. Such exemplary factors include (a) status/gear of the gearbox, (b) wheel/drive status, (c) a weight of a load carried by the vehicle, (d) the status of a selectable economy mode, (e) the status of a selectable sport mode, (f) a selectable NVH controller that allows an occupant of the vehicle to define different levels of acceptable NVH, (g) occupancy in the vehicle, (h) ambient temperature, (i) a model of NVH characteristics as the vehicle ages, (j) a model of the vehicle operation following a cold start, (k) an active noise cancelation/control system, (1) an active vibration control system, and (m) road surface conditions. Each of these factors are discussed in further detail below.

Tables

In the above discussion pertaining to gearing, wheel drive states, vehicle mass and/or payload, mounts, user adjustable features (e.g., eco, sport, luxury modes and/or NVH adjustable levels, temperature and/or occupancy sensors, models, active noise or vibration cancelling systems, and/or road surface monitoring equipment, it is proposed to adjust or "fine tune" the pulsing frequency and amplitude to take into account a wide variety of operating conditions and circumstances and any of the parameters or features discussed above. By fine tuning the frequency and amplitude either up or down, (1) higher levels of economy can be achieved, while (2) always providing "acceptable" levels of NVH, which may varying depending on conditions and circumstances. For each of the factors listed above, a number of different approaches can be used for ascertaining the pulsing frequency and amplitude that meet the above-described objectives (1) and (2). Such approaches include, but are not limited to, the use of tables, sliding scales, a multiplier/divider, etc.

A proposed approach of selecting a pulsing frequency and amplitude that allows for more or less NVH as conditions warrant, but without ever generating excessive levels of NVH, is the use of one or more table(s). With such an approach, one or more tables is/are constructed using empirical data for a given vehicle-electric machine or machines combination. From the data, the table(s) is/are constructed that define the ideal or preferred pulsing frequencies over a wide variety of operating conditions that permit for either more or less aggressive pulsing frequencies and amplitudes as circumstances warrant, meaning allowing more NVH or reducing NVH, without ever generating excessive levels of NVH.

Figure 4:
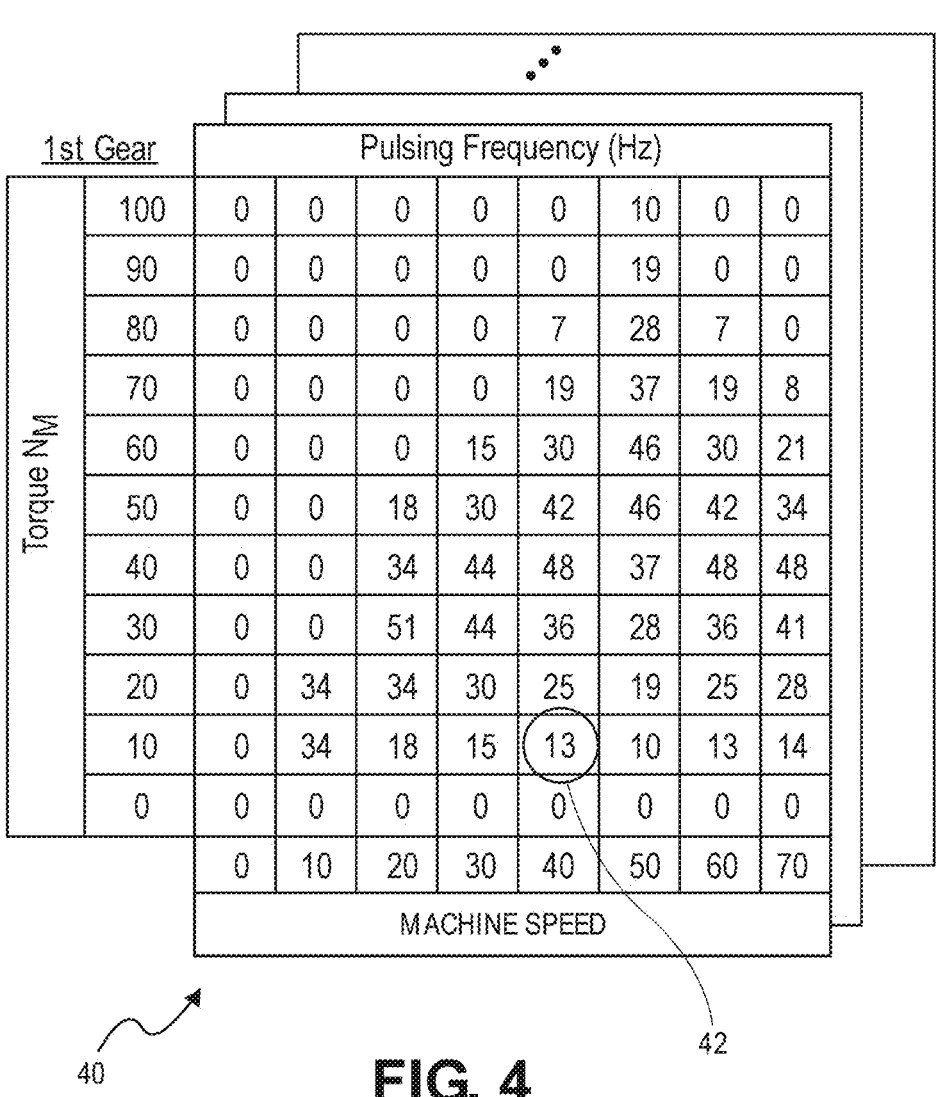
FIG. 4 illustrates a representative table that provides pulsing frequencies for different combinations of torque and/or machine speeds in accordance with a non-exclusive embodiment of the invention.

Referring to FIG. 4, an exemplary table 40 is provided. Table 40 lists the pulsing frequency for electric machines for a wide range of torque demands (Nm) and machine speeds for a vehicle operating in a first ($1^{st}$) gear of a gearbox. By way of example, the table 40 indicates a preferred pulsing frequency of 13 Hz, as signified by the circle 42, is suitable for the when the torque demand is 10 Nm, the speed is 40 rpms, and the gearbox is in first gear. While the vehicle is operating in first gear, the table 40 can be accessed as the torque demand changes and/or the speed changes. Thus, as driving conditions change, the table 40 can be indexed and a different pulsing frequency can be defined, depending on the current torque demand and speed. It is noted that the particular frequencies listed in the table are merely exemplary and should not be construed as limiting in any regard.

For the sake of simplicity, only one table 40 is described and illustrated. It should be understood that in real-world applications with most vehicles, typically multiple tables will be used. In certain non-exclusive embodiments, multiple tables are typically provided for each of the factors as defined above. For instance, tables are provided for each gear in the gearbox, for each possible configuration of the wheel drive, for a wide range of payloads, and so on for each of the above-listed factors. In each case, the various pulsing frequencies provided in the tables are created from empirical data collected during testing for a given vehicle-machine(s) combination. Once the testing of the vehicle is complete, and the empirical data collected and processed, the individual tables can be constructed. In each case, the pulsing frequencies are preferably selected that permit for either more or less aggressive pulsing frequencies, meaning more or less NVH, without ever generating excessive levels of NVH, while maximizing efficiency for a given set of conditions and/or circumstances.

It is further noted that the tables do not necessarily have to be two-dimensional as illustrated in FIG. 4, but rather may have more than two-dimensions. With gearing for example, a three dimensional table that is indexed by torque demand, machine speed and individual gears (i.e. $1^{st}$ gear, $2^{nd}$ gear, $3^{rd}$ gear, etc.) can be constructed as well, as opposed to having separate or distinct tables for each gear. Furthermore, the any of the remaining listed parameters and/or factors listed above can rely two or more than two dimensional tables as well. In yet other embodiments, there does not necessarily have to be a dedicated set of one or more tables for each of the parameters and/or factors listed above. In other embodiments, the proposed pulsing frequencies for multiple parameters and/or features can be combined into a single table or a set of related tables. For example driver selectable features such different driving modes (e.g., eco, sport, luxury, etc.) can all be combined into one table.

Sliding Scales and Multipliers/Dividers

In other non-exclusive embodiments, a sliding scale and/or a multiplier/divider can be used to ascertain the pulsing frequency and/or pulsing amplitude for any of of the factors listed above. For example with vehicle mass and/or payload, a sliding scale or multiplier can be used. In other words as the mass of the payload of a vehicle is increased or decreased, then the pulsing frequency and/or pulsing amplitude can each be either scaled downward or upward respectively. Alternatively, a multiplier/divider value can be used to adjust a base pulsing frequency for any of the above listed factors. In variations of these embodiments, the scaling factor and/or the divider/multiplier can be either linear or non-linear. In the case of the latter, scaling and/or multiplier/divider algorithms can be used to ascertain the pulsing frequency in a non-linear fashion depending on conditions and circumstances.

Motor Controller Architecture

Figure 5A:
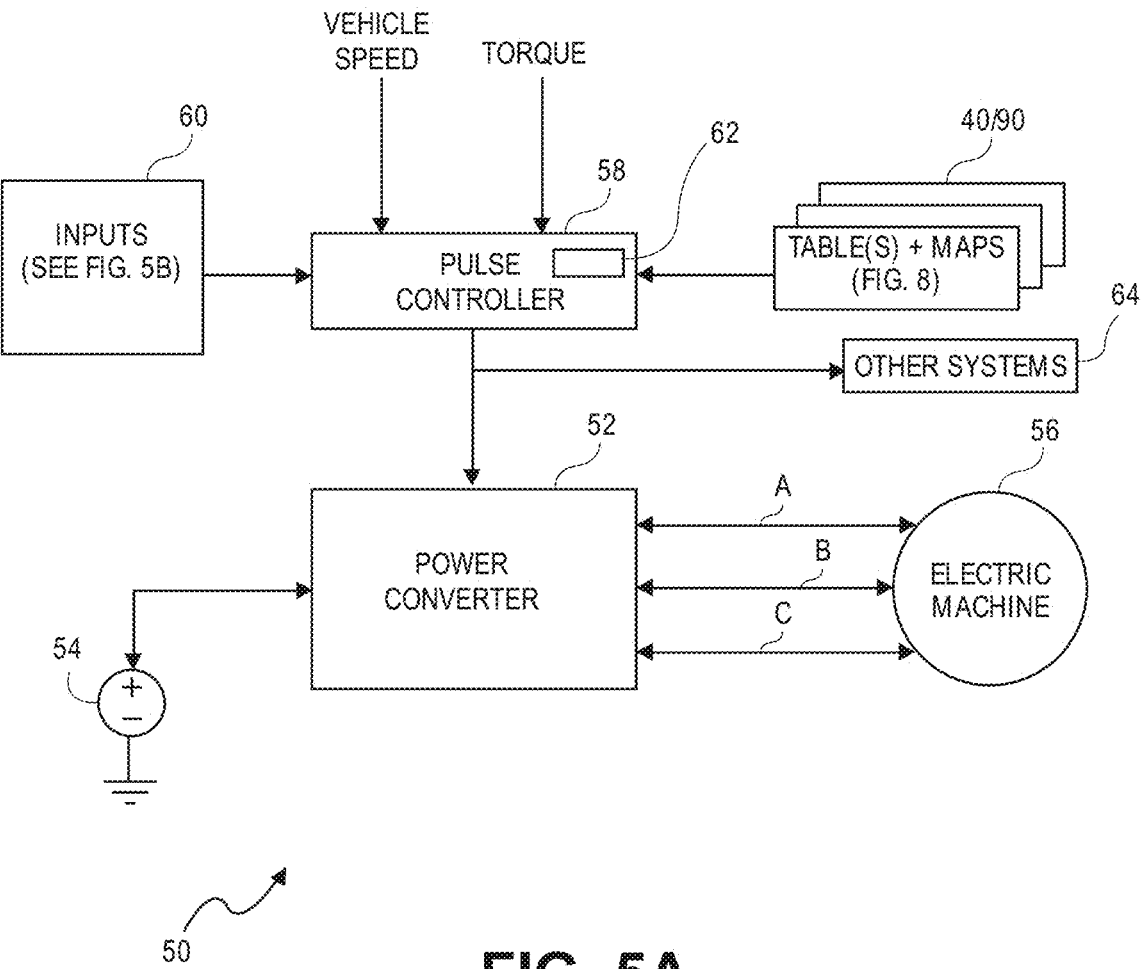
FIG. 5A is a functional block diagram illustrating a motor controller in accordance with a non-exclusive embodiment of the invention.

Referring to FIG. 5A, a block diagram of a power control architecture 50 is illustrated. The architecture 50 includes a power converter 52, a DC power supply 54, an electric machine 56, a pulse controller 58, one or more inputs 60, and one or more tables 40/90 (and the map of FIG. 8). In addition, the pulse controller 58 is arranged to receive torque demand and machine speed inputs. In an optional embodiment, the pulse controller 58 includes a computation module 62.

The power converter 52 operates as a power inverter or power rectifier depending on the direction of energy flow through the system. When the electric machine 56 is operated as a motor, the power converter 52 is responsible for generating three-phased AC power from the DC power supply 54 to drive the machine 56. The three-phased input power, labeled as phase "A", phase "B", and phase "C", is applied to the windings of the stator of the electric machine 56 as is well known in the art. When the electric machine 56 is operating as a generator, the power converter 52 operates as a power rectifier and the AC power coming from the electric machine 56 is converted to DC power that is stored in the DC power supply 54.

In various embodiments, the power controller 52 may be a conventional power converter or a "boosted" power converter, both of which are described in detail in commonly assigned U.S. application Ser. No. 16/818,570 filed Mar. 13, 2020, incorporated by reference herein for all purposes.

The pulse controller 58 is also responsible for (1) defining when the machine 56 should operate in a continuous mode or pulsed mode, (2) defining the pulsing frequency, pulsing amplitude, and duty cycle for the three-phased input power signals A, B and C when in the pulsed mode and (3) providing control signals so that the power converter 52 can either continuously generate or pulse the three-phase power signals A, B and C provided to the machine 46. During pulsed operation, the three-phase power signals A, B and C are pulsed in accordance with whatever the amplitude, duty cycle and pulsing frequency the pulse controller determines to meet the torque demand for a given speed.

To ascertain the pulsing frequency and pulsing amplitude, the pulse controller 58 receives one or more of the inputs 60 (see FIG. 5B for a list of possible inputs). In response, the pulse controller 58 accesses the one or more tables 40/90 and/or the map of FIG. 8 for any or all of (a) through (m) as defined above and ascertains a pulsing frequency and pulsing amplitude that maximizes efficiency without creating excessive NVH for a given set of inputs, operating conditions and circumstances. In this way, the machine 56 operates at or near it's the maximum efficiency level (e.g., see the curve 16 of FIG. 1), while allowing more or less NVH as conditions warrant, but without ever generating excessive levels of NVH. In an alternative embodiment, the computation module 62 can be used to scale, multiply, divide or apply an algorithm to ascertain the pulsing frequency and amplitude as described above. In various embodiments, the computation module may include a look up table, a multidimensional look up table, a sliding scale, a multiplier, a processor, a logic unit, a trained neural network, or any combination thereof.

It should be noted that the inputs listed in FIG. 5B are merely exemplary and should not be construed in any regard as exhaustive. On the contrary, the number and type of inputs may widely vary and should not be limited to those explicitly mentioned herein.

During driving, various torque demands will be made and the machine speed will change depending on the gear and as the vehicle accelerates and/or decelerate, drives up hills or down hills, etc. The pulse controller 58, in response, adjust the amplitude and duty cycle of the pulses as needed and ascertains the different pulsing frequencies to meet the instantaneous torque demands while preventing excessive levels of NVH. When conditions warrant, a more aggressive pulsing frequency and/or amplitude may be used to improve efficiency and economy. Alternatively, less aggressive pulsing and/or amplitude may be used to prevent excessive NVH. As a result, the vehicle can overall be operated in a highly efficient manner, while selectively controlling NVH levels generated by the electric machine 56 so as to prevent or mitigate excessive levels of NVH.

Sharing the Pulsing Frequency and Pulsing Amplitude

In yet another embodiment, the pulsing frequency and/or amplitude as defined by the pulse controller 58 can also be forwarded on to other sub-systems 64 on the vehicle that could utilize this information in meaningful ways. One example is to provide the pulsing frequency and/or amplitude to sub-system(s) 64 such active noise and/or vibration control, which could use the pulsing frequency and/or pulsing amplitude information as a reference/feed-forward signal to identify which frequencies to target for cancellation.

Competing Inputs

On occasion, two or more of the factors listed above may suggest or indicate that the base pulsing frequency and/or pulsing amplitude should be modified or adjusted in opposing directions. For example, switching from first gear to second gear allows the pulsing frequency to be reduced. However, if a user selectable NVH control requires a higher frequency for better NVH, then adjusting the pulsing frequency downward may not be feasible. On the other hand, if the vehicle is unoccupied, then adjusting the pulsing frequency downward is not a problem. Also, the pulsing amplitude can be adjusted upward if more NVH can be tolerated, or downward if less NVH can be tolerated. As these two examples illustrate, the pulse controller 58 preferably makes a final decision on pulsing frequency on a case-by-case basis after considering all the inputs (a) through (i) and a totality of the circumstances. It is noted that in the event of a conflict, the pulsing frequency is often adjusted so as to reduce NVH. It should be understood, however, that this is by no means a requirement. On the contrary for a given conflict, the pulsing frequency adjustment can result in an increase or decrease of NVH. Accordingly, the pulsing frequency for any two or more factors or features that are in conflict can be adjusted in accordance with any predetermined algorithm arranged to address the conflict.

Real-Time Feedback

Figure 6:
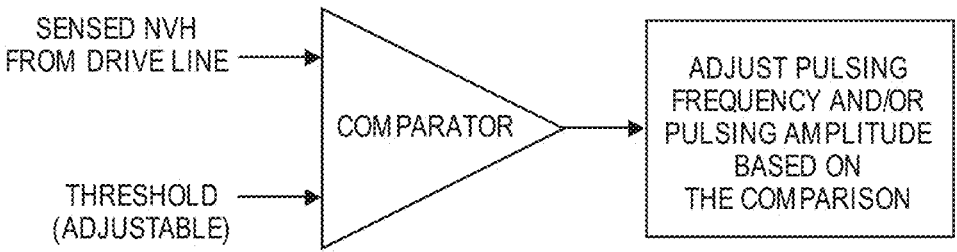
FIG. 6 is a diagram illustrating a real-time feedback for adjusting a pulsing frequency and/or amplitude of an electronic machine in accordance with a non-exclusive embodiment of the invention.

Referring to FIG. 6, a diagram illustrating real-time feedback for adjusting the pulsing frequency and amplitude in accordance with another embodiment is shown. In this embodiment, actual or sensed NVH is compared to a threshold. Based on the comparison, the pulsing frequency and amplitude can be adjusted either upward or downward. With implementations of this embodiment, the actual NVH can be measured by one or more noise and/or vibration sensors located on the vehicle, such in the cabin of the vehicle or somewhere along the driveline of the vehicle. If the comparison indicates that the sensed NVH is below the threshold, then the pulsing frequency can be adjusted downward or amplitude adjusted upward until the NVH increases and matches the threshold. On the other hand if the comparison indicates that the sensed NVH is above the threshold, then the pulsing frequency can be adjusted upward or amplitude adjusted downward until the NVH decreases and matches the threshold. It is further noted that in variations of this embodiment, the threshold can be adjustable as well. For example, if the vehicle has a NVH acceptable level controller, the threshold can be adjusted up or down depending on if the driver sets the level of NVH either high or low. The threshold can also be adjusted based on other inputs, such as eco mode, sport mode, luxury mode, etc.

OnTorque and Duty Cycle

As explained herein, the frequency of the on pulses while operating an electric machine as a motor on a vehicle for a given demanded torque may possibly be 'tuned" to meet an acceptable level of NVH. The factors that may be considered when determining an acceptable amount of NVH may include one or more of the above listed factors, including (a)

status/gear of the gearbox, (b) wheel/drive status, (c) a weight of a load carried by the vehicle, (d) the status of a selectable economy mode, (e) the status of a selectable sport mode, (f) a selectable NVH controller that allows an occupant of the vehicle to define different levels of acceptable NVH, (g) occupancy in the vehicle, (h) ambient temperature, (i) a model of NVH characteristics as the vehicle ages, (j) a model of the vehicle operation following a cold start, (k) an active noise cancelation/control system, (1) an active vibration control system, and (m) road surface conditions. These same factors (a) through (m), with the addition of another factor (n), the presence of an internal combustion engine (ICE) on the vehicle while operating, may also be used to tune the amplitude or OnTorque of the pulses as well. As used herein the terms OnTorque, OnTorque amplitude, DMD torque, and/or pulse amplitude all refer to the magnitude of the torque generated during on pulses during DMD operation. Hence, these terms are all interchangeably used herein.

During Dynamic Motor Drive (DMD) operation, the pulse controller 58 converts a received torque demand into string of on pulses that meet the request. This involves defining for the series of on pulses the (1) frequency of the on pulses, (2) the On-Torque amplitude during the on pulses, and (3) the duty cycle of the on pulses. Of these three parameters, the frequency is independently defined. On the other hand, the On-Torque amplitude of the on pulses and the duty cycle are dependent on one another. For instance, if the demanded torque is 60 Nm, then possibly any of the following may be used: (a) an On-Torque amplitude of 30 Nm and a duty cycle of 50%, (b) an On-Torque amplitude of 20 Nm and a duty cycle of 33%, or (c) an On-Torque amplitude of 15 Nm and a duty cycle of 25%. Since each of these options may result in higher or lower levels of NVH generated by the electric machine, selecting among the various options for a given torque request helps in tuning operation during DMD operation to meet an ascertained acceptable level of NVH.

While tuning the frequency for NVH considerations is known as described in parent applications, tuning the On-Torque amplitude during the on pulses and/or the duty cycle for NVH considerations has previously not been done before.

As described below, any of (a) through (n), or any combination thereof, may be used to tune the On-Torque amplitude during pulsed operation. By measuring and/or ascertaining the level of NVH generated by one or more of (a) through (n) during the operation of a vehicle, an acceptable or tolerable level of NVH may be defined. Once the acceptable level of NVH is defined, then each of the frequency, the OnTorque amplitude of the pulses can be selected and tuned during DMD operation to meet the acceptable level of NVH.

For instance, if a vehicle is experiencing high levels of NVH masking or otherwise able to tolerate higher NVH due to certain combinations of the factors (a) through (n), then the acceptable level of NVH for operating an electric machine as a motor may be set relatively high. With a high level of acceptable NVH, the frequency, the On-Torque amplitude, and duty cycle of the pulses can be aggressively set (i.e., more efficiency at the expense of higher NVH). Since the vehicle is able to tolerate higher levels of NVH, the additional NVH from operating the electric machine at a higher level of efficiency will be largely unnoticed by occupants of the vehicle. Alternatively, with other factors (a) through (n) not applicable to masking NVH per se, such as the vehicle is autonomous and has now occupants, gear selection, etc., then the acceptable level of NVH can be aggressively set. Again, this means the frequency, the On-Torque amplitude, and duty cycle of the pulses can be aggressively set (i.e., more efficiency at the expense of higher NVH). Specifically, the frequency of the pulses can be reduced, while the On-Torque amplitude is increased, both of which will improve efficiency.

On the other hand, if a vehicle is only able to tolerate low levels of NVH due to any combination of the factors (a) through (n), then the acceptable level of NVH may be set relatively low as the NVH caused by aggressively operating the electric machine for increased efficiency will likely be noticeable by the occupants. Consequently, the electric machine can be operated more conservatively so as to reduce levels of NVH. That is, the frequency of the pulses can be increased to reduce NVH but at the expense of reduced efficiency. And the On-Torque amplitude may also be decreased to reduce NVH, again at the expense of efficiency.

An explanation of how each of these factors (a) through (n) affect NVH is described below.

(a) Gearbox. The status and speed of a vehicle affects NVH considerations in at least two ways. First, depending on the selected gear of the gearbox, the resonant frequency of the drive line of the vehicle will change. For instance in a test electric vehicle with a 2-gear gearbox, the applicant has found the vehicle has a resonant frequency of approximately 7 Hz in the first gear, while having a resonant frequency of approximately 12 Hz while operating in second gear. Second, the speed of the vehicle also affects NVH considerations. When a vehicle is traveling at a relatively low speed, the level of NVH generated by external factors, such a tire noise, wind noise, rolling vibration, etc., are relatively low. On the other hand, when the vehicle is traveling at higher speeds such as on the freeway, then the NVH from all these external factors are higher.

(b) Wheel/drive status. The wheel/drive status refers to whether or not the vehicle is operating in forward or reverse and the number of wheels that are used to propel the vehicle at any point in time. Some vehicles are front wheel drive only, others are rear wheel drive only, and yet others are either full time four-wheel drive or all-wheel drive where each of the wheels is operated on demand when needed. With each of these types of vehicles, the NVH levels may vary depending on the wheel drive type or status. In each case or mode, the transmission, drive line and other mechanical linkages on the vehicle may have different NVH characteristics.

(c) Weight of a load carried by the vehicle. The weight of a vehicle effects NVH based on the basic equation of (Force=Mass×Acceleration). Consequently, the more the mass of the vehicle, the less acceleration (i.e., NVH) the vehicle will experience for a given external force (i.e., the external factors that cause NVH). Consequently, the electric machine may be operated more aggressively for efficiency during DMD operation when a vehicle is heavy and/or carrying a heavy load.

(d) The status of a selectable economy mode. If the vehicle has a selectable economy mode, then the electric machine can be aggressively operated for efficiency when in the economy mode. This means the frequency of the pulses can be decreased during DMD, while the On-Torque amplitude can be increased. On the other hand if the economy mode is not set, then the electric machine may be operated less aggressively during DMD so as not to create excessive amounts of NVH.

This means potentially increasing the frequency while reducing the On-Torque amplitude of the pulses during DMD operation.

(e) The status of a selectable sport mode. If a vehicle has a sport mode, it typically means the driver is not overly concerned about efficiency or NVH. As a result when the sport mode is implemented, the electric machine can be aggressively operated during DMD by decreasing the frequency while increasing the On-Torque amplitude of the pulses while operating in the DMD mode. Conversely, if the sport mode is not implemented, then the electric machine during DMD operation less aggressively, meaning the frequency is increased, and/or the On-Torque amplitude is reduced by relative amounts.

(f) NVH setting controller. If a vehicle has a selectable NVH controller that allows an occupant of the vehicle to define different levels of acceptable NVH, then the driver can select among various levels of tolerable NVH (e.g., low, medium and high). Once a level of tolerable NVH is set, then the frequency of the pulses during DMD operation can be raised/lowered depending and the OnTorque amplitude can also be increased/decreased depending on the selected level.

(g) Occupancy in the vehicle. If a vehicle is autonomous and has no occupants, then the acceptable level of NVH can be raised higher than if occupants are present. Consequently, an electric machine can be operated much more aggressively if no occupants are present. Again, this means decreasing frequency and increasing the OnTorque amplitude. If occupants are present, then the acceptable level of NVH may be revised downward, meaning increasing the frequency and/or reducing the OnTorque amplitude by relative amounts.

(h) Ambient temperature. As a general rule, the colder the ambient temperature, the more NVH is generated. At colder temperatures, components on the vehicle, such as motor and/or engine mounts, mechanical linkages, rubber bushings, etc., tend to be less effective than at higher ambient temperatures. Consequently, the frequency and/or the OnTorque amplitude can both be tuned higher or lower relative amounts depending on ambient temperature during DMD operation.

(i) A model of NVH characteristics as the vehicle ages. As a vehicle ages and components such as engine mounts, the suspension system, etc., wear, they tend to generate higher levels if NVH. The levels of NVH can thus be modeled as a vehicle ages and with use/mileage. Consequently, as the level of NVH of the vehicle increased over time, the frequency and/or the OnTorque amplitude can both be tuned higher or lower relative amounts depending on the modeled level of NVH during DMD operation.

(j) A model of the vehicle operation following a cold start. Similarly, when a vehicle is started from a cold start, more NVH tends to be generated. As the vehicle drives, components such as the electric machine, the transmission, the suspension, ICE, etc., tend to warm and operate more smoothly. By measuring these NVH characteristics following a cold start, a model can be generated. Based on the model, the frequency and/or the OnTorque amplitude can both be tuned higher or lower relative amounts depending on the modeled level of NVH following a cold start during DMD operation.

(k) Active noise cancelation/control system. If a vehicle has an active noise cancelation/control system, then the electric machine can be operated more aggressively in the DMD mode since the increased NVH will be at least partially cancelled out. Again, this typically means decreasing the frequency and/or increasing the OnTorque amplitude of the pulses during DMD operation.

(l) Active vibration control system. If a vehicle has an active vibration cancelation/control system, then the electric machine can be operated more aggressively in the DMD mode since the increased NVH will be at least partially cancelled out. Again, this typically means decreasing the frequency and/or increasing the OnTorque amplitude of the pulses during DMD operation.

(m) Road surface conditions. If a vehicle is equipped with a device capable of measuring a road surface, the frequency and/or the OnTorque amplitude of the on pulses may be tuned during DMD operation depending on the condition of the road surface the vehicle is traveling. As a general rule, if the surface is smooth, lower levels of masking NVH will be generated during driving. On the other hand if the road is bumpy and/or in poor condition, then more masking NVH will be generated. Accordingly, the electric machine can be operated either more or less aggressively during DMD operation depending on the level of the masking NVH from the road surface conditions. In other words, the frequency and/or the OnTorque amplitude of the on pulses may each be individually increased or decreased based on road surface conditions. In various embodiments, the device capable of measuring the road surface may be a camera, radar, lidar, GPS, vibration sensors, road conditions stored in a data cloud on the network and ascertained based on GPS location, wheel anti-lock brake (ABS) sensors, accelerometers, etc., or any combination thereof.

(n) The presence of an ICE. Certain electric vehicles have an onboard ICE, operating as either a range extender or in parallel (i.e., a hybrid) with the electric machine(s). When an ICE is operating, it tends to generate higher levels of NVH. Therefore, when the ICE is operating on the vehicle, the NVH from the ICE will tend to mask out the NVH generated by the electric machine(s). Accordingly, the electric machines can be operated either more or less aggressively during DMD depending on whether the ICE is operating or not respectively.

The Fundamental Amplitude or "FA" is the amplitude of the fundamental frequency component of a waveform. For a pulse train of given On-Torque amplitude and duty cycle, FA is calculated from equation (1) provided below:

$$FA = OnTorque \cdot \left(\frac{2}{\pi}\right) \cdot \sin(\pi \cdot \text{duty cycle}) \qquad \text{Equation (1)}$$

The FA is, therefore, a function of On-Torque and duty cycle.

Figure 7:
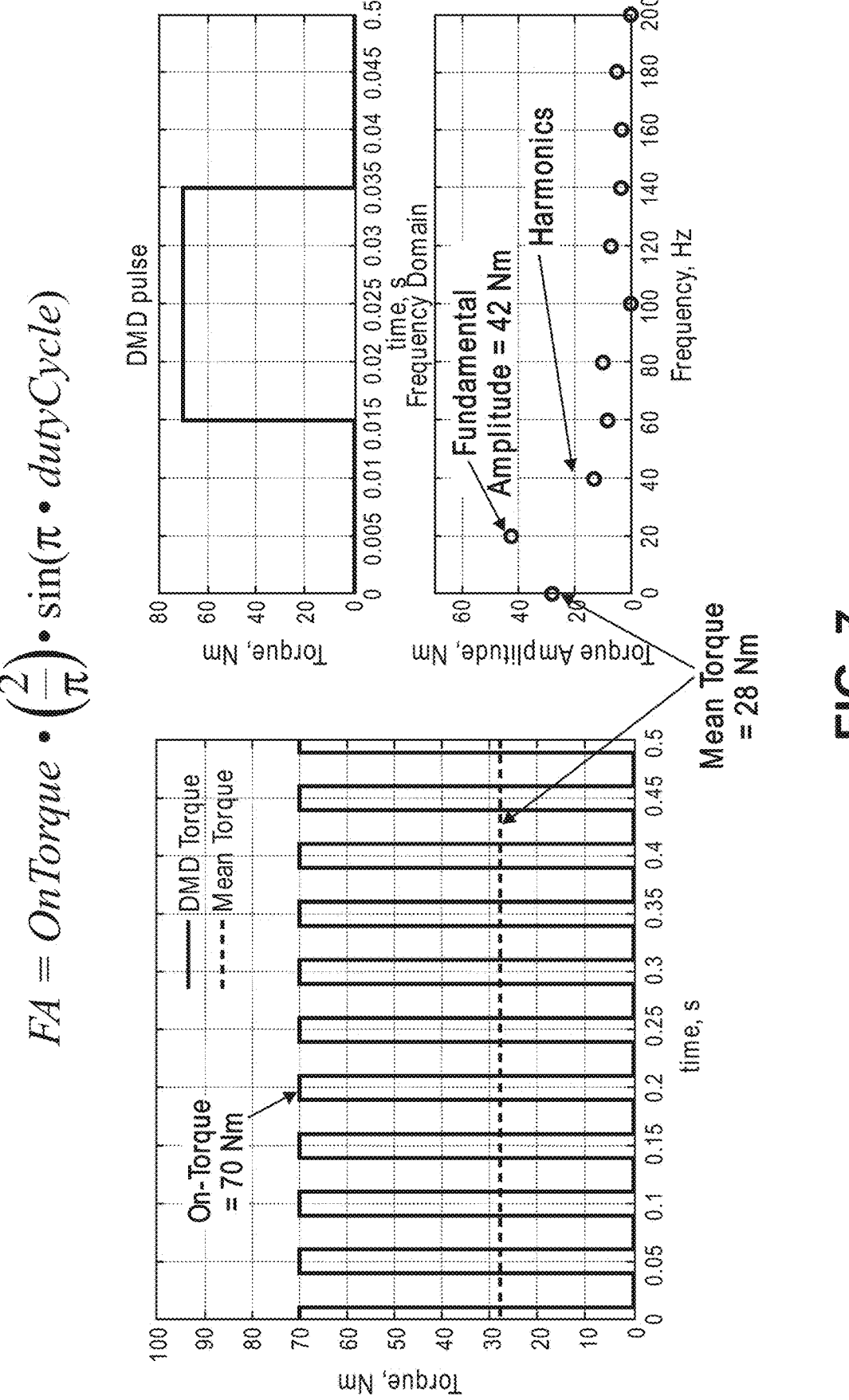
FIG. 7 is a diagram showing how a Fundamental Amplitude or "FA" of the sinusoidal component of the fundamental frequency of an exemplary pulsing excitation is calculated in accordance with a non-exclusive embodiment of the invention.

FIG. 7 is an example of how FA is calculated for an exemplary series of on pulses during DMD operation. In this case, the on pulses have an On-Torque amplitude of approximately 70 Nm, a frequency of approximately 20 Hz, and a duty cycle of 40%. An FFT operation results in the calculation of the mean value and harmonic values at multiples of the fundamental frequency (20 Hz in this example). Instead of an FFT operation, Equation 1 may be used to directly compute the amplitude of the fundamental component at 20

Hz. For the FIG. 7 example, fundamental amplitude (FA) is approximately 42 Nm and the mean torque is 28 NM.

The FA may be used as a simplified surrogate for NVH since the higher harmonics are typically attenuated by the vehicle's structural dynamics. For a given pulsing frequency, a higher FA indicates a higher level of NVH. The calibrator may set a threshold of FA that is allowable based on what is acceptable subjectively or based on objective measurements of noise and vibration. This threshold of FA is FAmax. FAMax is, therefore, the maximum threshold Fundamental Amplitude or "FA" in which a given electric machine (operating whether as a motor or generator) is allowed to operate at a given pulsing frequency during DMD operation.

It is noted that in the frequency domain response for the example provided in FIG. 7 shows $2^{nd}$ and higher harmonic components. Since both vehicles and human perception are more sensitive to NVH at lower frequencies, these higher harmonics may be ignored since the fundamental frequency is the most impactful in terms of NVH.

During DMD operation, the pulse controller 58 (see FIG. 5) will typically define the frequency of the pulses. Prior to now, the On-Torque amplitude and duty cycle were not selected and/or defined with NVH considerations in mind. As described below, the On-Torque amplitude can now be selected so that the resulting FA does not exceed the FAMax, which means NVH is kept within acceptable limits. And once the On-Torque amplitude is known, then an appropriate duty cycle can be defined.

Figure 8:
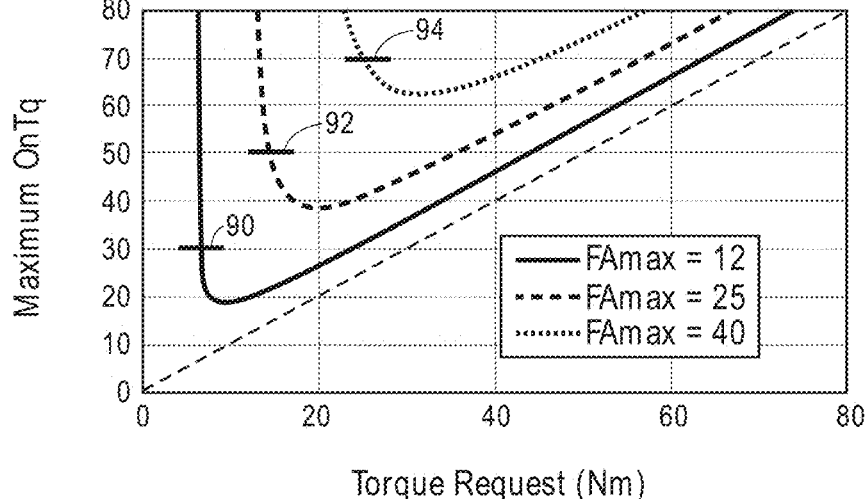
FIG. 8 is an exemplary OnTorque map for several FAMax calculations over a range of demanded torque requests for an electric machine in accordance with a non-exclusive embodiment of the invention.

Referring to FIG. 8, an exemplary maximum OnTorque map for several FAMax thresholds over a range of demanded torque requests is illustrated. In this example, the maximum OnTorque values corresponding to three different values of FAmax are provided along the vertical axis while the range of demanded torque requests are provided along the horizontal axis. The three FAmax curves in this example are 12 Nm, 25 Nm and 40 Nm.

In FIG. 8, three FAMax curves for Dec. 25, 1940 was chosen for illustrative purposes, each calibrated to correspond to different levels of acceptable NVH. In this example, if the demanded torque request by a driver is 40 Nm, then the maximum OnTorque for the three FAMax curves are:

65 Nm for FAMax=40 Nm
55 Nm for FAMax=25 Nm
45 Nm for FAMax=12 Nm

The purpose of these curves is to reverse-calculate the On-Torque and duty cycle from a maximum allowable FA instead of calculating FA for a given On-Torque and duty cycle. During DMD operation, one of the FAMax curves will be selected depending on the level of NVH that is considered acceptable. For example, if the middle FAMax curve is selected, then the OnTorque is maintained at or below 55 Nm for a demand torque request of 40 Nm. Similarly, the OnTorque is maintained at or below 65 or 45 Nm if the upper or lower FAMax curves are used respectively.

The map of FIG. 8 shows that at lower demanded torque range (e.g., +/–20 Nm), the maximum OnTorque values increase to dramatically high levels beyond the practical output levels of a given electric machine. As a result, it is necessary to "cap" the OnTorque values in the lower range of demanded torques. As illustrated in the map of FIG. 8, three caps designated by reference numerals 90, 92 and 94 are provided for the FAMax curves 12, 25 and 40 respectively. In various embodiments, a number of factors may be used to determine the cap for each FAMax curve. Such factors may include, but are not limited to, the acceptable levels of NVH and/or any combination of the factors (a) through (n) described herein.

The FIG. 8 map thus results in a selection of an OnTorque value for a given torque demand and NVH considerations. If the objective is to lower NVH produced by the electric machine, then the lower OnTorque value is used based on the FAMax curve=12. On the other hand if more NVH can be tolerated, then either the OnTorque valued based on the middle FAMax curve=25 or upper FAMax curve=40 may be used.

Once an OnTorque value is defined, then a duty cycle may be defined.

In various embodiments, the data for each of the factors (a) through (n) for a given vehicle may be maintained or calculated by one or more single dimension look up table(s), one or more multi-dimensional look up tables, a sliding scale, a multiplier, a processor, a logic unit, a trained neural network, or any combination thereof. Such tables or computations may be maintained or implemented in the tables 40 and/or computation module 62 discussed herein.

Figure 9:
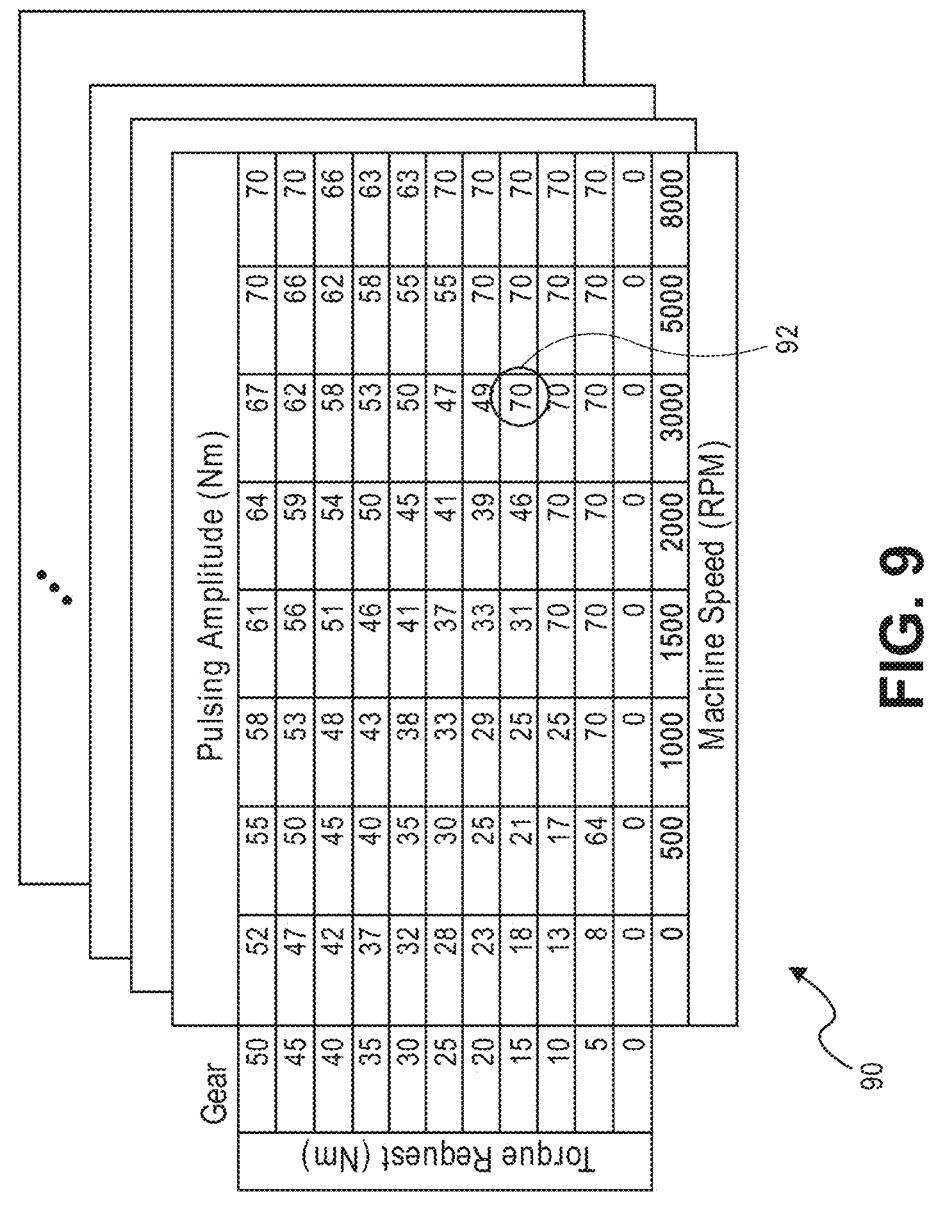
FIG. 9 illustrates a representative table that provides pulsing amplitudes for different combinations of torque and/or machine speeds in accordance with a non-exclusive embodiment of the invention.

Referring to FIG. 9, an exemplary table 90 is provided. Table 90 lists the pulsing amplitude for electric machines for a wide range of torque demands (Nm) and machine speeds for a vehicle. By way of example, the table 90 indicates a preferred pulsing amplitude of 70 Nm, as signified by the circle 92, is suitable for the when the torque demand is 15 Nm and the machine speed is 3000 rpms. While the vehicle is operating, the table 90 can be accessed as the torque demand changes and/or the speed changes. Thus, as driving conditions change, the table 90 can be indexed and a different pulsing amplitude can be defined, depending on the current torque demand and speed. It is noted that the particular amplitudes listed in the table are merely exemplary and should not be construed as limiting in any regard. For the sake of simplicity, only one two-dimensional table 90 is described and illustrated. It should be understood that in real-world applications with most vehicles, typically multiple or three-dimensional tables 90 may be used. In certain non-exclusive embodiments, multiple tables are typically provided for one or more of the factors as defined above. For instance, tables are provided for each gear in the gearbox, for each possible configuration of the wheel drive, for a wide range of payloads, and so on for each of the above-listed factors (a) through (n). In each case, the various pulsing frequencies provided in the tables are created from empirical data collected during testing for a given vehicle-machine(s) combination. Once the testing of the vehicle is complete, and the empirical data collected and processed, the three-dimensional tables can be constructed. In each case, the pulsing amplitudes are preferably selected that permit for either more or less aggressive pulsing amplitudes, meaning more or less NVH, without ever generating excessive levels of NVH, while maximizing efficiency for a given set of conditions and/or circumstances. In yet other embodiments, there does not necessarily have to be a dedicated set of one or more tables for each of the factors listed above. In other embodiments, the proposed pulsing amplitude for multiple parameters and/or features can be combined into a single table or a set of related tables. For example driver selectable features such different driving modes (e.g., eco, sport, luxury, etc.) can all be combined into one table.

Electric Vehicle (EV) and Hybrid Operation

During DMD operation on a vehicle, the pulse controller 58 (see FIG. 5) determines the overall NVH experienced by the vehicle from any of factors (a) through (n). Once the overall level of NVH is known, the pulse controller 58 (1) ascertains the acceptable level of NVH for the electric machine, and then (2) selects a pulsing frequency, an OnTorque amplitude and a duty cycle for the pulses used to drive the electric machine to meet the demanded torque request and the acceptable level of NVH for the electric machine. The pulse controller 58 ascertains the pulsing frequency by either accessing one or more tables 40 of FIG. 4 and/or relying on the computation module 62. The maps 90 of FIG. 9 may be further used during DMD operation to tune the On-Torque amplitude of a given series of pulses for NVH considerations.

The overall NVH experienced by the vehicle may vary depending on the type of vehicle. In an EV without any ICE, the tolerable levels of NVH is typically lower than with vehicles with an ICE. On the other hand, with vehicles including an ICE, regardless of whether the ICE is used in parallel with onboard electric machine(s) operating as motor(s) or simply used as a range extender, higher levels of NVH are typically more acceptable during ICE operation because the noise and vibration caused by the ICE will mask out the same generated during pulsing of the electric machines.

Figure 10:
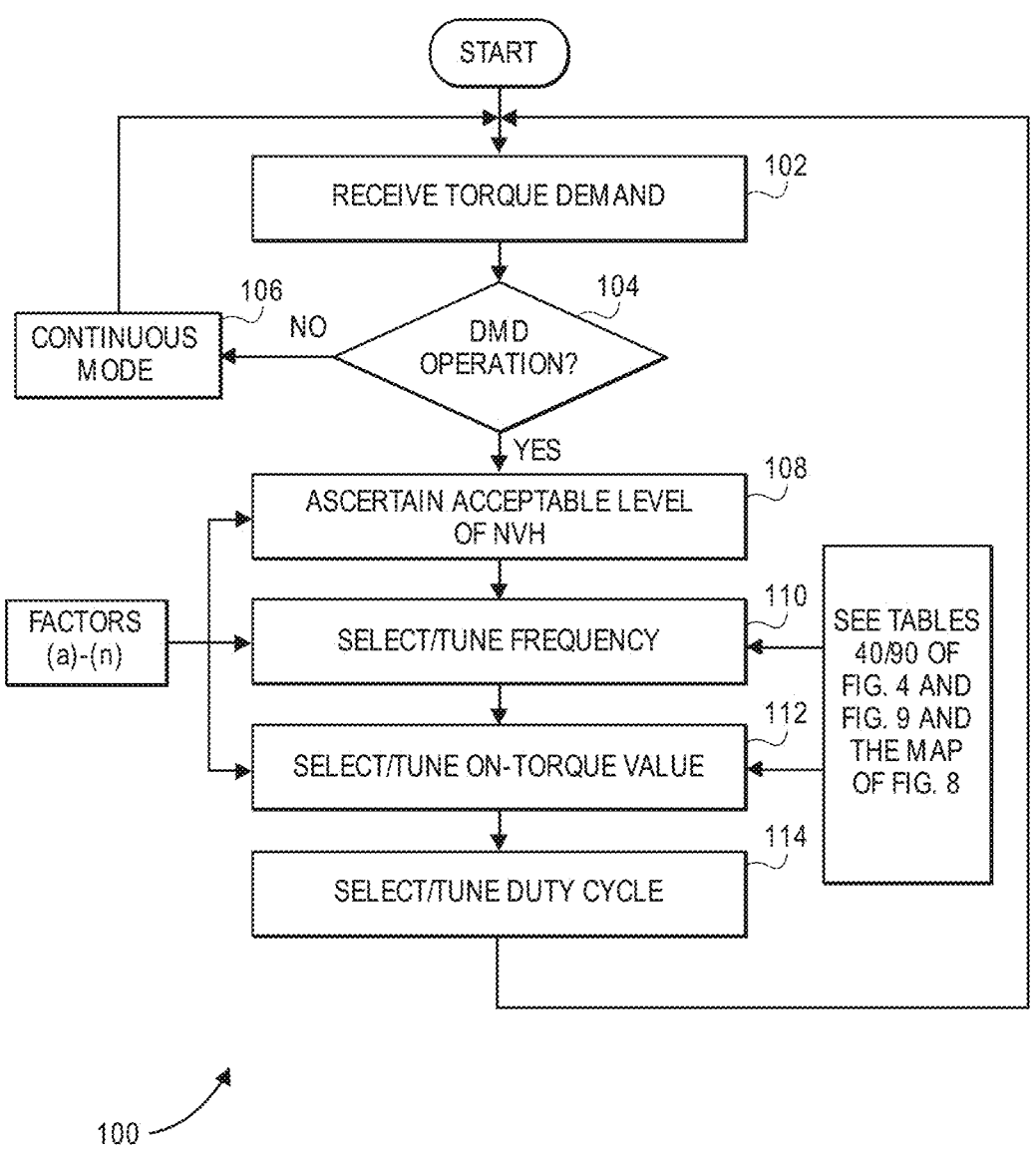
FIG. 10 is a flow chart showing operation of an electric machine for selecting/tuning the frequency, On-Torque amplitude, and duty cycle of on pulses during DMD operation in accordance with a non-exclusive embodiment of the invention.

Referring to FIG. 10, a flow chart 100 showing operation of an electric machine on a vehicle for selectively tuning the frequency and/or On-Torque of on pulses during DMD operation is illustrated.

In an initial step 102, a torque demand is received.

In decision step 104, the pulse controller 58 determines if the electric machine should be operated in a continuous mode or the DMD mode.

If the torque request is above a certain threshold, then the electric machine is operated in the continuous mode per step 106.

On the other hand, if the demanded torque is below the threshold, then the machine is operated in the DMD mode. In alternative embodiments, one or more parameters are used in setting the threshold for DMD operation. These parameters may include but are not limited to the current speed of the machine, the type of electric machine, the presence of excessive levels of emf, operational modes where DMD operation is not desirable, gear rattle, etc. Consequently, it is possible to operate the electric machine in the continuous mode even when the requested torque is below its maximum efficiency threshold.

Per step 108, the pulse controller 58 determines an acceptable level of NVH for operating the electric machine in the DMD mode. Again, the acceptable level may widely vary based on any of the factors (a) through (n) or other factors as well.

In subsequent steps 110, 112, and 114, the pulse controller 58 selects and tunes each of the frequency and the On-Torque amplitude to meet both (1) the torque demand and (2) the acceptable level of NVH for the electric machine. These steps 110, 112, and 114 can be performed serially or substantially in parallel. Also, any of the factors (a)-(n) may be considered when selecting/tuning the frequency, and/or the On-Torque amplitude. Once the On-Torque amplitude is defined, the duty cycle is determined accordingly. The maps or tables of FIG. 4, FIG. 9 and/or the map of FIG. 8 may also be considered when selecting/tuning the frequency, and/or the On-Torque amplitude.

As the torque demand and factors that affect the level of acceptable NVH change, the above steps 102 through 114 are continually repeated. In this manner, the torque demand is continually met while the electric machine is operating in the DMD mode, while each of the frequency, On-Torque amplitude, and duty cycle parameters for each selected series of pulses are tuned to meet acceptable levels of NVH for the electric machine.

Non-Exclusive Embodiments

In one embodiment, the present invention pertains to an electric machine controller for controlling the pulsing of an electric machine onboard a vehicle. In particular, the electric machine controller is arranged to, (i) determine a torque demand for operating the machine as a motor, (ii) determine an amplitude for pulsed operation of the machine as the motor, (iii) determine a duty cycle for the pulsed operation of the machine as the motor, the amplitude and the duty cycle resulting in the generation of the determined torque demand, and (iv) ascertain a frequency for the pulsed operation of the machine as a motor while generating the determined torque demand, the frequency ascertained by taking into account Noise, Vibration and Harshness (NVH) either (a) caused by a measurable parameter of the vehicle or (b) a feature on the vehicle that adjust an amount of the NVH that is acceptable.

In another embodiment, the present invention pertains to a method of pulse controlling an electric machine used on a vehicle. The method involves pulsing the electric machine at a frequency and amplitude that has been adjusted to take into account Noise, Vibration and Harshness (NVH) that is either caused by one or more components on the vehicle or that allows an adjustment of an amount of the NVH that is acceptable.

In yet another embodiment, the present invention pertains to an electric machine controller for controlling pulsing of an electric machine. The machine controller is configured to receive a signal indicative of a magnitude of Noise, Vibration and Harshness (NVH), compare the magnitude of NVH to a threshold; and adjust a pulsing frequency and/or amplitude used to pulse the electric machine if the magnitude of the NVH exceeds the threshold, the pulsing frequency adjusted so that the magnitude of the NVH is reduced below the threshold.

Other Machine Types and Applications

It should be apparent from the foregoing description that the described pulsed machine control can be utilized in a wide variety of different applications to improve the energy conversion efficiency of a wide variety of different types of electric motors and generators. These include both AC and DC motors/generators. A few representative types of electric machines that may benefit from the described pulsing include both asynchronous and synchronous AC electric machines including Induction machines (IM), switched reluctance machines (SRM), Synchronous Reluctance machines (SynRM), Permanent Magnet Synchronous Reluctance machines (PMaSynRM), Hybrid PMaSynRMs; Externally Excited AC Synchronous machines (SyncAC) (also sometimes referred to by other names such Wound Field Synchronous machines (WFSM), Wound Rotor Synchronous machines (WRSM), or Electrically Excited Synchronous Machines (EESM)) Permanent Magnet Synchronous machines (PMSM), Eddy current machines, AC linear machines, AC and DC mechanically commutated machines, axial flux motors, etc. Representative DC electric machines include brushless, electrically excited, permanent magnet, series wound, shunt, brushed, compound and others.

Additional Embodiments

Although automotive applications have been used as an example of a vehicle propulsion application, it should be appreciated that the described control approach is equally beneficial in other propulsion related applications including electric motors used in other types of vehicles including trucks, cars, carts, motorcycles, bicycles, drones and other flying devices; in robots and other devices that move autonomously within an environment; etc. As such, the term "vehicle" should be broadly construed to include all of the above and any other type of motorized moving assembly whether known now or developed in the future.

Motors used in appliances such as washing machines, dryers, heating, ventilation and air conditioning (HVAC) applications are another good examples of applications that can benefit from pulsed control. There are several components that contribute to pulsed motor control being a good fit for HVAC applications. These include the facts that: (a) the machines used in HVAC applications today are predominantly induction motors that don't contain permanent magnets; (b) a high percentage of the motors used in HVAC applications, including in particular variable speed HVAC condensers and/or air handlers, operate a substantial portion of the time operating regions below their high efficiency areas; and (c) the inertia of a fan or pump normally dominates the motor inertia, which tends to further mitigate potential NVH related impacts associated with pulsing.

Although only a few embodiments of the invention have been described in detail, it should be appreciated that the invention may be implemented in many other forms without departing from the spirit or scope of the invention. The various described pulse controllers and other control elements may be implemented, grouped, and configured in a wide variety of different architectures in different embodiments. For example, in some embodiments, the pulse controller may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

The pulse generator or machine controller may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

Generally, the schemes for pulsed motor control may be implemented digitally, algorithmically, using analog components or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In some implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive, and the invention is not to be limited to the details given herein but may be modified within the scope and equivalents of the appended claims.

What is claimed is:

1. An electric machine on a vehicle, comprising:
a controller for controlling the electric machine, the controller configured to:
receive a torque demand;
ascertain an acceptable level of Noise, Vibration and Harshness (NVH) for operating the electric machine;
ascertain an On-Torque amplitude and a duty cycle for a series of pulses to operate the electric machine in a pulsed mode to meet the ascertained acceptable level of NVH and the received torque demand; and
operate the electric machine in the pulsed mode, using the series of pulses, the series of pulses having the ascertained On-Torque amplitude and the duty cycle,
wherein the electric machine generates a work output sufficient to meet the torque demand during the series of pulses and substantially no work output between the series of pulses.

2. The electric machine of claim 1, wherein the controller is further configured to:
ascertain a frequency for the series of pulses to operate the electric machine in the pulsed mode to meet the ascertained acceptable level of NVH and the received torque demand; and
operate the electric machine in the pulsed mode, using the series of pulses, the series of pulses having the ascertained frequency, the ascertained On-Torque amplitude, and the duty cycle.

3. The electric machine of claim 1, wherein the controller is configured to ascertain the acceptable level of Noise, Vibration and Harshness (NVH) for operating the electric machine from one or more factors.

4. The electric machine of claim 3, wherein the one or more factors include a gearbox status of a gearbox on the vehicle.

5. The electric machine of claim 3, wherein the one or more factors include a wheel drive status of a wheel drive system on the vehicle.

6. The electric machine of claim 3, wherein the one or more factors include a weight of a load carried by the vehicle.

7. The electric machine of claim 3, wherein the one or more factors include a setting of a selectable economy mode feature provided on the vehicle.

8. The electric machine of claim 3, wherein the one or more factors include a setting of a selectable sport mode feature provided on the vehicle.

9. The electric machine of claim 3, wherein the one or more factors include a setting of a selectable NVH mode feature provided on the vehicle.

10. The electric machine of claim 3, wherein the one or more factors includes whether or not the vehicle is (a) autonomous or not autonomous, and (b) occupied by any persons if autonomous.

11. The electric machine of claim 3, wherein the one or more factors includes ambient temperature around the vehicle.

12. The electric machine of claim 3, wherein the one or more factors includes a model of NVH characteristics of the vehicle as the vehicle ages.

13. The electric machine of claim 3, wherein the one or more factors includes a model of NVH characteristics of the vehicle after a cold start of the vehicle.

14. The electric machine of claim 3, wherein the one or more factors include a setting of an active noise control system provided on the vehicle.

15. The electric machine of claim 3, wherein the one or more factors include a setting of an active vibration control system provided on the vehicle.

16. The electric machine of claim 3, wherein the one or more factors include whether or not an internal combustion engine on the vehicle is operating.

17. The electric machine controller of claim 3, wherein data for ascertaining the acceptable level of NVH for operating the electric machine from the one or more factors is stored in or derived from one of the following:

(a) a look up table;
(b) a multi-dimensional look up table;
(c) a sliding scale;
(d) a multiplier;
(e) a processor;
(f) a logic unit;
(g) a trained neural network; or
(e) any combination of (a) through (g).

18. The electric machine of claim 1, wherein the On-Torque amplitude and the duty cycle are at least partially ascertained from a maximum On-Torque value derived from a Fundamental Amplitude Maximum (FAMax) table.

19. The electric machine of claim 1, wherein the controller is further configured to selectively adjust the On-Torque amplitude depending on whether the ascertained acceptable level of NVH is relatively high or relatively low as compared to a predetermined level of NVH respectively.

20. A method for operating an electric machine on a vehicle, comprising:

receiving a torque demand;

ascertaining an acceptable level of Noise, Vibration and Harshness (NVH) for operating the electric machine;

ascertaining an On-Torque amplitude and a duty cycle for a series of pulses to operate the electric machine in a pulsed mode to meet the ascertained acceptable level of NVH and the received torque demand; and operating the electric machine in the pulsed mode, using the series of pulses, the series of pulses having the ascertained On-Torque amplitude and the duty cycle, wherein the electric machine generates a work output sufficient to meet the torque demand during the series of pulses and substantially no work output between the series of pulses.

21. The method of claim 20, further comprising:

ascertaining a frequency for the series of pulses to operate the electric machine in the pulsed mode to meet the ascertained acceptable level of NVH and the received torque demand; and operating the electric machine in the pulsed mode, using the series of pulses, the series of pulses having the ascertained frequency, the ascertained On-Torque amplitude, and the duty cycle.

22. The method of claim 20, further comprising ascertaining the acceptable level of NVH for operating the electric machine from one or more factors.

23. The method of claim 22, wherein the one or more factors include a gearbox status of a gearbox on the vehicle.

24. The method of claim 22, wherein the one or more factors include a wheel drive status of a wheel drive system on the vehicle.

25. The method of claim 22, wherein the one or more factors include a weight of a load carried by the vehicle.

26. The method of claim 22, wherein the one or more factors include a setting of a selectable economy mode feature provided on the vehicle.

27. The method of claim 22, wherein the one or more factors include a setting of a selectable sport mode feature provided on the vehicle.

28. The method of claim 22, wherein the one or more factors include a setting of a selectable NVH mode feature provided on the vehicle.

29. The method of claim 22, wherein the one or more factors includes whether or not the vehicle is (a) autonomous or not autonomous, and (b) occupied by any passengers if autonomous.

30. The method of claim 22, wherein the one or more factors includes ambient temperature around the vehicle.

31. The method of claim 22, wherein the one or more factors includes a model of NVH characteristics of the vehicle as the vehicle ages.

32. The method of claim 22, wherein the one or more factors includes a model of NVH characteristics of the vehicle after a cold start of the vehicle.

33. The method of claim 22, wherein the one or more factors include a setting of an active noise control system provided on the vehicle.

34. The method of claim 22, wherein the one or more factors include a setting of an active vibration control system provided on the vehicle.

35. The method of claim 22, wherein the one or more factors include whether or not an internal combustion engine is operating on the vehicle.

36. The method of claim 22, further comprising storing or calculating data for ascertaining the acceptable level of NVH for operating the electric machine in or from one of the following:

(a) a look up table;
(b) a multi-dimensional look up table;
(c) a sliding scale;
(d) a multiplier;
(e) a processor;
(f) a logic unit;
(g) a trained neural network; or
(e) any combination of (a) through (g).

37. The method of claim 20, wherein the On-Torque amplitude and the duty cycle are at least partially ascertained from a maximum On-Torque value derived from a Fundamental Amplitude Maximum (FAMax) table.

38. A vehicle, comprising:

an internal combustion engine provided on the vehicle;

an electric machine provided on the vehicle;

a controller for controlling the electric machine, the controller configured to:

receive a torque demand;

ascertain an acceptable level of Noise, Vibration and Harshness (NVH) for operating the electric machine;

ascertain an On-Torque amplitude and a duty cycle for a series of pulses to operate the electric machine in a pulsed mode to meet the ascertained acceptable level of NVH and the received torque demand, the On-Torque amplitude and duty cycle ascertained at least partially based on whether the internal combustion engine is operating when the torque demand is received; and operate the electric machine in the pulsed mode, using the series of pulses, the series of pulses having the ascertained On-Torque amplitude and the duty cycle, wherein the electric machine generates a work output sufficient to meet the torque demand during the series of pulses and substantially no work output between the series of pulses.

39. The vehicle of claim 38, wherein the controller is further configured to ascertain the On-Torque demand from one or more other factors besides whether the internal combustion engine is operating, the one or more other factors including:

(a) a gearbox status of a gearbox on the vehicle;

(b) a wheel drive status of a wheel drive system on the vehicle;

(c) a weight of a load carried by the vehicle;

(d) a selectable economy mode feature provided on the vehicle;

(e) a setting of a selectable sport mode feature provided on the vehicle;

(f) a setting of a selectable NVH mode feature provided on the vehicle;

(g) whether or not the vehicle is autonomous or not autonomous, and if autonomous, whether or not the vehicle is occupied by a passenger;

(h) ambient temperature around the vehicle;

(i) a model of NVH characteristics of the vehicle as the vehicle ages;

(j) a model of NVH characteristics of the vehicle after a cold start of the vehicle;

(k) a setting of an active noise control system provided on the vehicle; or (l) a setting of an active vibration control system provided on the vehicle.

* * * * *